United States Patent [19]
Burns et al.

[11] Patent Number: 5,626,739
[45] Date of Patent: May 6, 1997

[54] ELECTROKINETIC LEACHING

[76] Inventors: Colin J. Burns, 11 Hollywood Court, Bendigo, Victoria, Australia, 3550; David J. Wright, 2 Peg Leg Road, Eagle Hawke, Victoria, Australia, 3556

[21] Appl. No.: 360,781
[22] PCT Filed: Jun. 29, 1993
[86] PCT No.: PCT/AU93/00318
 § 371 Date: Feb. 27, 1995
 § 102(e) Date: Feb. 27, 1995
[87] PCT Pub. No.: WO94/00608
 PCT Pub. Date: Jan. 6, 1994

[30] Foreign Application Priority Data

Jun. 29, 1992 [AU] Australia ............... PL3205

[51] Int. Cl.⁶ ............................................. C25C 1/00
[52] U.S. Cl. .................. 205/767; 205/771; 205/772; 205/565; 205/571; 205/574
[58] Field of Search ............. 204/180.1; 205/767, 205/766, 771, 772, 565, 571, 574

[56] References Cited

U.S. PATENT DOCUMENTS

| | | | |
|---|---|---|---|
| 3,819,231 | 6/1974 | Fehlner | 204/106 |
| 5,015,351 | 5/1991 | Miller | 204/180.1 |
| 5,049,248 | 9/1991 | Muralidhara et al. | 204/180.1 |
| 5,074,986 | 12/1991 | Probstein et al. | 204/180.1 |
| 5,137,608 | 8/1992 | Acar et al. | 4/180.1 |

Primary Examiner—John Niebling
Assistant Examiner—Kishor Mayekar
Attorney, Agent, or Firm—Jacobson, Price, Holman & Stern, PLLC

[57] ABSTRACT

A method of treating a solid material containing a substance of economic importance so as to recover or extract the substance from the material involving the following: forming a conducting mixture of the solid with a liquid so that at least some of the substance of economic importance is dissolved in the liquid, applying an electrical potential difference between at least two electrodes in contact with the mixture at spaced apart locations so as to impart opposite charges to the respective electrodes thereby attracting the liquid containing the dissolved substance to one of the electrodes, removing the liquid from an area surrounding or from a vicinity of the one electrode, and treating the liquid containing the substance of economic importance so as to recover or extract the substance. The liquid used is at least partially conducting. The present method is particularly useful for extracting or recovering gold from gold-containing or gold bearing ores.

17 Claims, 7 Drawing Sheets

ELECTROKINETIC LEACHING

The present invention relates generally to the treatment of naturally occurring materials having some economic importance, such as for example mined materials or ores, and particularly to the treatment of ore materials containing a valuable component, such as for example a precious metal. More particularly, the present invention relates to the extraction of one or more components of a solid material or a mixture or combination of solid materials by the dissolution of the valuable component or components in a liquid and the subsequent or simultaneous extraction of the dissolved component(s) from the liquid. In particular the present invention relates to the extraction of precious metals, such as for example gold, silver and the like from ores containing these metals. The present invention finds particular application as an improvement in the extraction of gold from gold containing materials using a leaching solution to dissolve the gold from these materials.

Although the present invention will be described with particular reference to an improvement in the leaching step of the overall process of extracting gold from gold-containing materials, such as for example ores, it is to be noted that the scope of the present invention is not so limited to being restricted to the described embodiment, but rather the scope of the present invention is more extensive so as to include other methods and processes of obtaining materials of economic value and to other applications than those specifically described.

It is further to be noted that although the present invention will be described with particular reference to recovering or extracting gold, the use of this term is merely for the sake of clarity and brevity only and is not meant to be limiting to the scope of the invention in any way. Also, it is to be note that the process methods of the present invention are equally applicable to other materials of high economic value, such as for example silver, copper and other valuable or precious metals.

BACKGROUND OF THE INVENTION

Existing methods for recovering or extracting gold from gold-containing or gold bearing ores consist of three separately identifiable stages. The first stage is the dissolution of the valuable component i.e. the gold, by forming a solid/liquid mixture i.e. a solution of dissolved gold. The second stage is the separation of the solids and liquids from the liquid/solid mixture to produce a "clean" solution of the liquid containing the dissolved gold or valuable component. The third stage is the extraction of the valuable component from the clean solution. The present invention is an improvement in and/or an alternative for the first two of these three stages. Thus, the present invention relates to an improvement in the steps of dissolving the gold and separating the dissolved gold solution from undissolved raw material.

Existing methods of recovering or extracting gold from solid materials using the above three stages can be generally classified in accordance with the particle size of the solid material bearing the gold that is to be treated by the method.

Firstly, for materials having a largest size of about 1 mm and having a relatively low proportion of fines (which is the term used to describe particles having a size of less than 20 micrometers), one existing method consists of forming a slurry of the solid material to be treated with a suitable leach solution and agitating the slurry so formed for a predetermined time to allow the gold to more or less fully dissolve. The undissolved solid material is then separated from the liquid leach solution by washing, thickening and/or filtering the slurry in order to provide a "clean" solution containing the gold. The separated undissolved solid material is then discarded to waste or may be retreated.

Secondly, for materials which have a largest size of about 500 micrometers and a large proportion of fines, merely dissolving the solid material in a leach solution is not feasible due to the difficulties associated with separating the undissolved solid material from the leach solution to obtain a clean solution of the gold. In the treatment of materials having this particle size range it is additionally necessary to add to the slurry relatively large sized particles of an absorbent substance or substances which absorb the gold from the liquid and which can then be more readily separated from the remaining undissolved non-gold bearing material and from the leach solution. These relatively large sized particles of absorbent materials are subsequently removed from the slurry, often by screening, and then subjected to further processing to extract or otherwise recover the gold.

Thirdly, for material which has a largest size of greater than 1 mm the material to be treated may be placed in a vat and then flooded with leach solution. After a predetermined time the gold-containing solution is drained from the base of the vat providing a clean solution for further processing to recover the valuable component.

Fourthly, for material with a largest size of up to two meters the material may be placed in a heap and the heap irrigated with leach solution. The solution permeates the heap and exits from the base of the heap carrying dissolved gold. The gold can then be recovered from the leach solution.

In any of the above described processes the particle size of the material being treated may be modified. For example, gold bearing material such as ore, is seldom found in a form where the gold is available for direct contact by the leach solution. The more usual situation is where the gold is encased either partially or wholly in the host rock which is usually highly impermeable to liquid and thus initially the leach solution does not have direct access to the gold. As a consequence, it is common practice to comminute the material to a size where the gold is more accessible and can be contacted by the leach solution. This process is known as liberation of the gold.

In cases where the solids/liquid separation stage is achieved by means of drainage, such as in the third and fourth methods described above, it is sometimes necessary to agglomerate the dissolved material prior to recovering the gold which has the effect that any fine particles which are present are agglomerated along with the large particles of material being treated and accordingly are held stationary within the body of the material being leached, thus preventing further recovery.

All of the above processes have one or more limitations., problems or shortcomings and further, they do not always result in the gold being extracted or recovered efficiently or economically.

The first method as described above is limited to the treatment of material which can be readily separated to form a clean solution, such as for example by being readily dewatered by gravitational techniques. Consequently, this process is limited to only those materials of a relatively coarse size only. Additionally this method is also relatively costly in terms of both the capital expenditure required to initially set up the plant and equipment for carrying out this process, and the ongoing operating costs.

Whilst the second method overcomes the dewatering problems associated with the first method it still remains relatively costly to both set up and operate.

The third and fourth method both rely completely on the natural drainage properties of the material being treated in order to achieve satisfactory solid/liquid separation. This is not always effective since the leach solution containing the gold may accumulate in unwanted or in inaccessible locations. In both the heaps of material being treated and the vats containing the material being treated, migration of fine material to either the base of the heap or to a position within the body of the material being leached sometimes prevents adequate drainage through the heap which creates zones where the leach solution becomes stationary and accordingly the method is inefficient in this respect.

Whilst such problems may be partially overcome by agglomeration of the fines, the formation and strengthening of the agglomerates which is sometimes necessary constitutes an additional step in the overall process which further adds to the overall cost of the process.

Therefore, there is a need for a material treatment process in which the leach solutions can be made to pass more efficiently through a wide variety of materials having virtually any particle size distribution. Accordingly, it is one aim of the present invention to provide a process comprising a more efficient leaching step which is applicable to a wide range of materials, irrespective of the properties of the material and which is an improvement over existing methods. The improvement is achieved by applying a potential difference across the solid/liquid mixture so that by the use of electro-osmosis or similar processes liquid is caused to pass through the solid/liquid material at a rate significantly greater than that which can be achieved under gravitational forces alone.

Electro-osmosis as the term is used in the present specification is a term used to describe the phenomenon caused when an electrical potential difference is applied across a solid/liquid mixture. The solid particles present in the slurry or liquid/solid mixture carry a negative surface charge and as a result a positive charge is induced on the liquid molecules immediately adjacent to such particles. This effectively gives the liquid, usually water in the cases of aqueous mixtures, a positive charge. When an electrical field is established between two separated electrodes which are buried in the slurry the solid particles will not undergo appreciable movement because of their relatively close packing, but the water, on the other hand, will be carried towards the negatively charged cathode due to the viscous drag of the migrating positive ions as they move towards the cathode. Such movement is called electro-osmotic flow.

As electro-osmotic flow resulting from electro-osmosis is relatively independent of the pore size of the solid particles of the solid/liquid mixture undergoing electro-osmosis, this technique is applicable to a wide range of size distributions of the solid particles.

Provided that a current can be induced through the solid/liquid mixture, the rate of liquid movement through the mixture and hence through the solid particles will be increased above that which can be achieved under gravitational force alone. The rate of liquid movement achieved is dependent on the size of the potential difference applied, the electrode configuration and the separation between the electrodes. Thus, for a given electrode configuration and a given electrode separation the amount of liquid flow through the mixture can be adjusted by changing the size of the potential difference applied to the mixture.

SUMMARY OF THE INVENTION

According to the present invention there is provided a method of treating a solid material containing a substance of economic importance to recover or extract the substance, the method comprising forming a conducting fluid/solid mixture of the solid material to be treated with a fluid which is at least partially conducting whereby at least some of the substance of economic importance is dissolved in the fluid, applying a potential difference between at least two different electrodes in contact with the fluid/solid mixture at spaced apart locations in order to import opposite charges to the respective electrodes, attracting fluid containing the dissolved substance of economic importance to one of the electrodes, removing the fluid from the area surrounding or in the vicinity of the one electrode, and treating the fluid containing the substance of a economic importance so as to recover the substance.

Typically, the material of economic importance is a precious metal, more typically gold, silver, copper or the like and most preferably gold.

Typically, the fluid is a solution, more typically an aqueous solution which acts as a leaching or irrigating solution. Typically, the leaching solution contains a material capable of dissolving gold, such as for example, cyanide.

Typically, the process of the present invention can be applied to either material which has not been treated previously, i.e. virgin material more or less as mined or extracted from the earth, or to material which previously has been treated by one or other existing process which has proved to be either inefficient or otherwise not capable of recovering all the gold from the ore resulting in significant amounts of gold being left behind in the ore.

Typically, where the material has been leached previously it is possible that the gold exists in a form which is capable of being directly dissolved by or soluble in the dissolving fluid and hence the addition of any chemicals to effect dissolution of the gold in a pretreatment process is not required. However, other pretreatment processes may be possible.

Typically, the present invention can be carried out at any temperature from ambient temperature upwards and is effective at temperatures between the melting point and boiling point of the liquid present used to extract or dissolve the gold, typically becoming more effective with increasing temperature within that range.

Typically, the potential difference applied across the slurry formed from adding the liquid to the gold bearing material could be in the range from less than a volt to several hundred volts, depending on the specific application. Typically, power consumption of applying the potential difference will be within the range 0.1 to 100 Kilowatt-Hrs per tonne of solid material being treated. More typically, the current passing through the solid/liquid mixture is about 1 ampere per square meter. More typically, the voltage of the potential difference applied to the slurry is adjusted so as to achieve the required current.

Leach times can vary enormously but typically are anything from about ten days to about one year or more.

Typically, the selection of optimum conditions of leach time and potential difference applied, both of which effect power consumption, given the electrical properties of the material being treated, are made on the basis of the economics of each individual situation so as to achieve maximum benefits.

Typically, the electrode arrangement used in the practice of the process of the present invention can be readily adapted so as to take advantage of the use of electrophoresis to assist with the settling of fine particles. Electrophoresis is the term used to describe the migration of small electrically charged particles through a stationary liquid.

Typically, the slurry produced from adding the leach liquid to the gold bearing ore which has been comminuted often contains 40 to 70% liquid and it is often necessary to recycle a major portion of this liquid for a variety of reasons which include, the cost of liquid supply, the cost of liquid storage and to reduce the harmful effects of liquid disposal on the environment. The use of electrophoresis can greatly assist in the rapid recycling of liquid which results in savings and less damage to the environment.

Typically, the polarity of the electrodes used for electro-osmosis can be reversed either at the end of or during the process of the present invention. Reversal of the polarity can be a single occurrence or may be done periodically. Settling of the solids in the slurry will be greatly enhanced by polarity reversal which will result in a clear liquid being produced near the negatively charged electrode. This liquid is then available for recycling.

BRIEF DESCRIPTION OF THE DRAWINGS

The present invention will now be described by way of example with reference to the following examples and accompanying drawings in which.

DETAILED DESCRIPTION OF THE PREFERRED EMBODIMENTS

EXAMPLE 1

Figure 1:
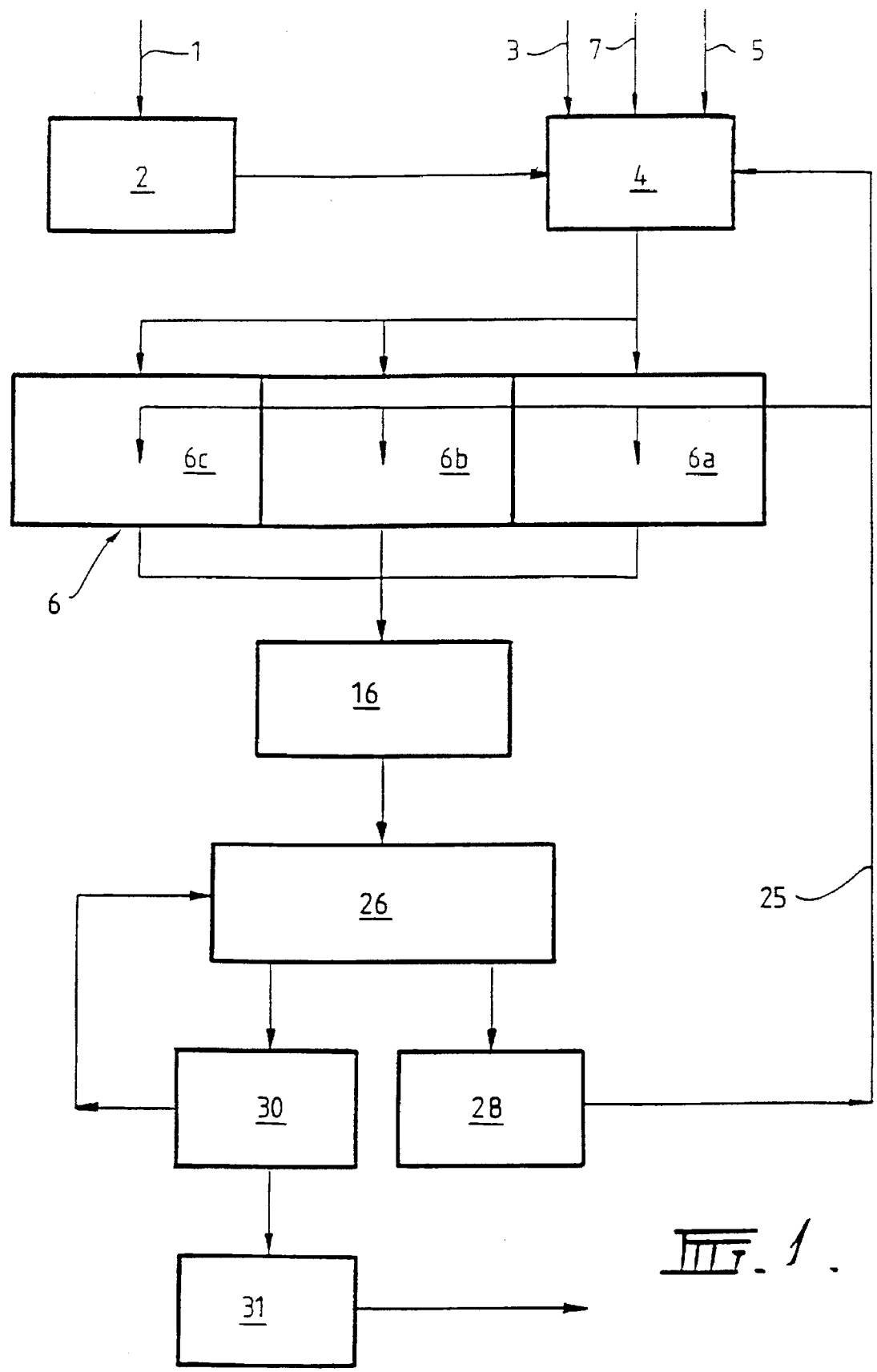
FIG. 1 is a flowsheet of one example of treating ore using the method of the present invention as described in Example 1.

With particular reference to FIG. 1, there is shown a flow chart in which a gold bearing ore, denoted by reference numeral 1 having the characteristics and properties listed below is treated by one form of the method of the present invention.
Description of Ore The material to be treated comprises a Mineable Resource of 500.000 tonnes having on average 5 grams of gold per tonne of the mineable resource.

The Specific Gravity of the mineable resource is about 2.6 and the Liberation Size of the particles from which gold can be recovered is about 50 micrometers The Characteristics of the Ore to be treated include the following:
Extremely slow settling rate
Settled solids content 60%
Settled solids mass contains 1.5 tonnes of solids per cubic meter.
Recovery of gold by cyanidation in 30 days is 75 of the total amount of gold present in the ore.

The process of Example 1 is illustrated in the Flowchart of FIG. 1 and comprises the steps of taking the material to be treated, i.e. the ore, 1 and passing the ore 1 to a crushing circuit, generally denoted as 2, which consists of a three stage crushing operation using a primary jaw crusher, a secondary cone crusher, and a tertiary cone crusher operating in closed circuit with a vibrating screen. After passing through the crushing circuit 2 the ore is reduced to a maximum particle size of about 10 millimeters on average.

The crushed ore from the crushing circuit 2 is then fed to a grinding circuit 4 comprising a two stage ball milling circuit consisting of two ball mill/cyclone circuits in series. The grinding circuit 4 reduces the maximum particle size of the ore to 60 micrometers.

Lime 3 in euitable form and Sodium Cyanide 5 are added to the grinding circuit, together with a suitable solvent, such as water 7, to form a slurry of the ore being treated.

Figure 2:
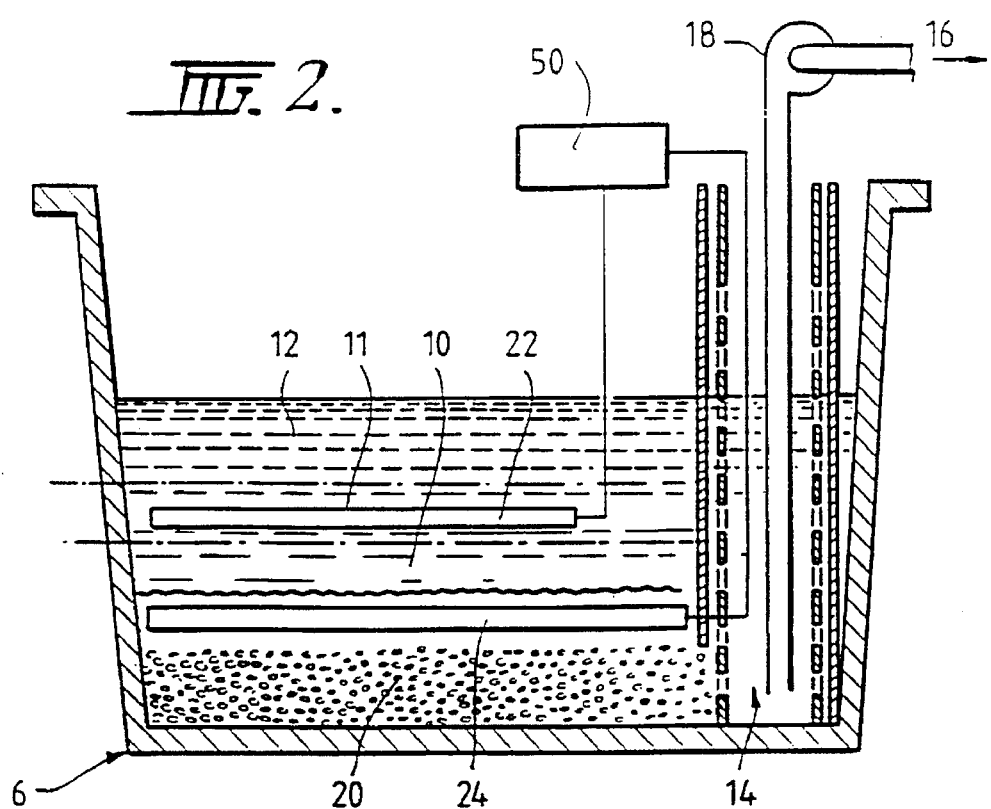
FIG. 2 is a schematic view of one form of a leach pond used in one embodiment of the process of the present invention.

The product from grinding circuit 4, which is in the form of a slurry containing 30% solids, by weight is then directed to a leaching pond, generally denoted as 6, which comprises three separate leaching ponds 6a, 6b, 6c, so that the slurry is admitted to one of ponds 6a, 6b or 6c in which a leaching cycle is conducted. The general arrangement of one of the ponds 6a, 6b or 6c is illustrated in FIG. 2. However, other arrangements of the leaching pond are possible.

Leach Pond 6 comprises in use a clear water zone 12 located towards the upper surface of pond 6, a settling zone 11, a settled solids zone 10 and a drainage zone 20 located at the base of the pond 6.

With particular reference to FIG. 2, the leach cycle in pond 6a and in the other ponds 6b and 6c consists of three stages which are filling, leaching and drainage, and each stage is of 28 days duration. During the filling stage a total of 11200 tonnes of ore, in a slurry containing 30% solids, is fed to the pond from grinding circuit 4. In each day 400 tonnes of solids reaches the settled solids zone 10 of leach pond 6a, together with 400 cubic meters of entrained water. At the same time 533 cubic meters of water reach the clear water zone 12 add enter discharge well 14 to be pumped away to pregnant pond 16 by means of pump 18.

Within the settled solids zone 10 compaction of the solids bed occurs which squeezes some of the entrained water out of zone 10 into the drainage zone 20 for removal via well 14 to pregnant pond 16 by means of pump 18. By the end of the first 28 day period the settled solids zone 10 contains 60% solids which means that a total of 3733 cubic meters of initially entrained water has been removed to the pregnant pond 16.

As the above described processes are occurring, dissolution of the gold initially contained in the ore will also be occurring wherever the ore is in contact with the liquid slurry.

After the filling stage is completed in first pond 6a, fresh slurry from grinding circuit 4 is directed to the second leaching pond 6b and the leaching process commences in the first pond 6a.

During the second 28 day period of the process which is the 28 day leaching stage in pond 6a barren leaching solution 25 will be pumped from barren leaching solution pond 28 (to be described in detail later) and drawn through the bed of ore solids in the settled solids zone 10 through to drainage zone 20, which comprises a bed of screen aggregate. The leaching solution is drawn to the drainage zone 20 through settled solids zone 10 by applying a potential difference between a first electrode 22 located at the top of pond 6a and a second electrode 24 located at the bottom of the settled solids zone 10 of pond 6a.

During the second 28 day period which is the 28 day leach period of pond 6a a total of 11200 cubic meters of initially barren leach solution is passed through the settled solids zone 10 dissolving gold and picking up dissolved gold on the way. The gold containing leach solution is then directed to pregnant pond 16 via drainage zone 20 and well 14 by means of pump 18.

At the termination of the leach stage conducted in the first pond 6a the drainage stage will then commence in pond 6a while a leach stage will commence in the second pond 6b, and a filling stage will commence in the third pond 6c. Thus, the three ponds 6a,6b,6c all operate out of phase, with a different stage of the three stage process occurring in each pond at any one given time. Furthermore, each of the three stages is operated in sequence in cycles.

During the drainage stage the flow of barren leach solution 25 from barren pond 28 to the leach pond 6a is stopped but the flow of leach solution through the settled solids zone 10 continues under the effect of the potential difference applied between the electrodes 22,24 to dissolve and transport the gold.

During the drainage stage the solids content of the settled solid zone 10 is increased to 80%. This results in a further 4667 cubic meters of leach solution being obtained via the drainage zone 20 and well 14.

Table 1 shows the inputs and outputs to each of the individual stages, and the accumulative amounts of each material.

The liquid movement induced in the leaching stage by the application of a potential difference between the respective electrodes in accordance with the present invention is sufficient over depths of up to about 5 meters, although the potential difference between the electrodes will need to be increased as the depth of the heap being treated increases.

When the depth of the settled zone 10 reaches 5 meters, which occurs after the sixth drainage stage, a new drainage layer and new electrodes will be required.

At any point in time, with the exception of the first and last fifty six days of the life of the operation there is one of the three stages in progress in one of the leach ponds 6 at all times. Consequently the flow and grade (amount of dissolved gold) of pregnant solution is constant over the three ponds in operation. During the first two and last two 28 day periods the flow of pregnant solution is low since all three ponds are not in operation. Table 2 shows the periodic output from the three ponds combined while Table 3 shows the annual and overall performance.

All pregnant solution containing dissolved gold taken from each of the leach ponds 6a,6b,6c is directed to the pregnant solution pond 16 which acts as a feed source for a set of adsorption columns containing activated carbon in a carbon adsorption circuit 26. In carbon adsorption circuit 26 gold is removed from the gold containing pregnant solution by being absorbed onto the activated carbon thus producing a solution exiting from the circuit 26 which is substantially free of gold i.e. a barren solution. The barren exit solution from carbon adsorption circuit 26 is directed to barren pond 28 from which leach solution 25 is drawn for delivery to the leach ponds 6 during further leach cycles.

The carbon, having become loaded with gold, is periodically removed from the adsorption columns of the carbon adsorption circuit 26, and the gold is stripped from the carbon by way of elution with a hot caustic/cyanide solution and then returned to the adsorption circuit 26 ready to remove further gold from further lots of pregnant solution.

The caustic/cyanide solution containing the gold stripped from the carbon is then passed through an electrolytic cell 30 where the gold is plated out onto a steel wool electrode. When fully loaded with gold, the electrode is then calcined add the resulting calcine smelted to produce gold ore. The gold in a more or less purified form can then be refined from the gold ore hence recovering the gold from the original gold-bearing ore which processes are denoted by 31 in FIG. 1.

EXAMPLE 2

Figure 3:
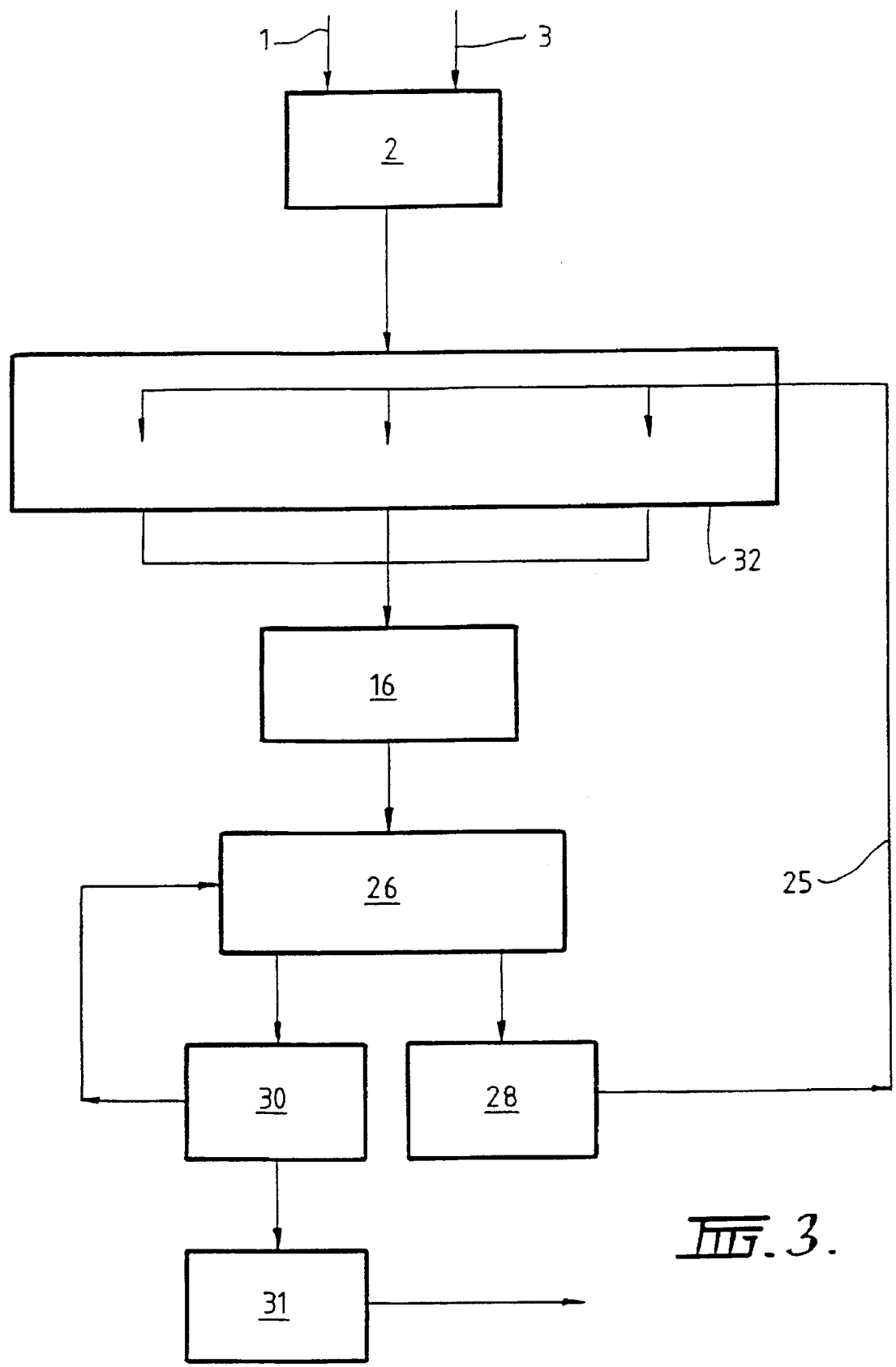
FIG. 3 is a flowsheet of a further example of treating ore using the method in accordance of the present invention as described in Example 2.

With particular reference to FIG. 3, there is shown a further flow chart in which a gold bearing ore 1 having the characteristics and properties listed below is treated by another form of the method of the present invention.
Description of Ore The ore to be treated comprises a Mineable Resource of some 1,000,000 tonnes having on average 2 grams of gold per tonne of the mineable resource.
The Specific Gravity of the ore is about 2.6 and the characteristics of the Crushed Ore to be treated are as follows:

High fines content

Low compressive strength

Bulk density 1.5 tonnes of solids per cubic meter

Angle of repose 35° C.

Heap leachable, with agglomeration to give 80% recover in 90 days.

The general flowsheet of this form of the treatment is shown in FIG. 3 which comprises a crushing circuit 2 consisting of a primary jaw crusher followed by an impact crusher operating in closed circuit with a vibrating screen. Lime 3 is added to the feed of the secondary crusher of the crushing circuit 2.

The crushed ore exiting from crushing circuit 2 is transported, such as for example by truck to a heap leach pad 32 where it is stacked and levelled by a bulldozer or similar to form a heap or pile of crushed ore to a height of 10 meters.

When a heap containing one month's delivery of crushed ore has been obtained, barren solution 25 containing sodium cyanide, acting as an irrigating or leaching solution is pumped onto the top of heap 32 at a rate of about 10 liter/hour per square meter of heap area. The irrigating solution 25 is drawn to the base of the heap by gravity, aided by the method of the present invention.

After a period of about 60 days irrigation of the heap is discontinued and the heap drained, again assisted by the method of the present invention.

When the entire heap area has been covered, to a height of 10 meters, a second lift or heap of ten meters is built upon the first heap. This is repeated until a total of five lifts or heaps have been built into a single stack.

The nature of the ore being treated in this example is such that, without using the method of the present invention, heap leaching would only be possible after agglomeration and careful handling of the agglomerated product. Furthermore, the stack height is limited by the low strength of the ore.

Figure 4:
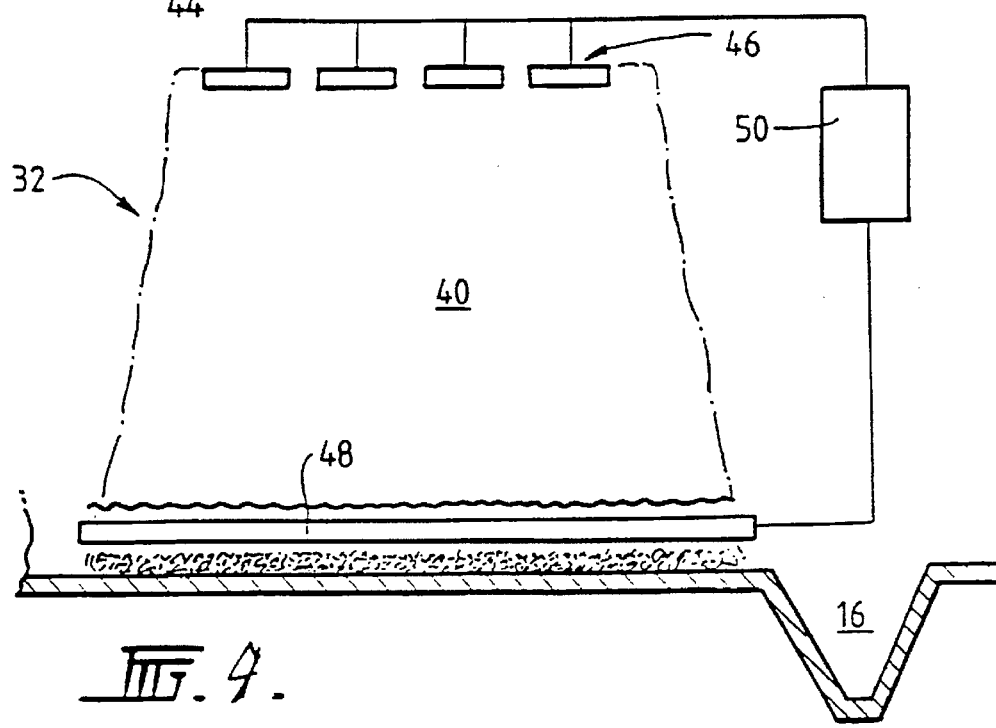
FIG. 4 is a schematic view of one form of a heap treated by one form of the process of the present invention.

The general arrangement of a single ore heap or stack is shown in FIG. 4.

Irrigation of the heap 40 is effected by barren irrigating or leaching solution 25 being pumped from a suitable reservoir such as barren pond 28 through pipes 42 to exit through nozzles 44 located above the top level of the heap 40. The irrigation of heap 40 is maintained for a three month period. A potential difference is applied to the heap by locating an anode or anodes 46 at or towards the top of the heap 40 and a cathode or cathodes 48 at the base of the heap near to where the pregnant solution exits from the heap. Anode 46 and cathode 48 are each in electrical connection with a direct current supply 50 and in electrical connection with each other through heap 40 to complete an electrical circuit. After the initial wetting of the ore the amount of pregnant solution exiting from the base of the heap is about the same as that irrigating the heap.

At the end of the about three months irrigation period the flow of irrigating solution 25 to the heap from pipes 42 is discontinued but the potential difference between the electrodes 46,48 maintained. This causes the irrigation solution to flow through and exit from the heap. After a period of about one month for drainage the potential difference between the electrodes is disconnected and the heap allowed to rest.

About one year after the drainage stage has been completed the potential difference is reapplied and the heap irrigated with irrigating solution 25 for a further period of about three months. During this further period any gold which has dissolved into the irrigating solution during the year of inactivity is recovered.

Table 4 shows the performance which is achieved on each one months sample of ore at 10 day intervals from the commencement of the further three month period. Table 5 shows the performance overall.

The process for extraction of the gold from the pregnant solution, and the subsequent production of gold is carried out as described in example 1.

EXAMPLE 3

In this form of the method of the present invention tailings resulting from a cyanidation operation, which had been completed some years previously were left in a dump. The dimensions of the dump are 200 by 200 by 10 meters deep and the dump contains some 600,000 tonnes of tailings.

The tailings contain one gram of gold per tonne on average, of which 0.6 grams is water soluble.

The material in the dump is extremely fine and virtually impermeable to water flow by gravity. Accordingly, the present invention can be used to extract the water soluble gold, in-situ, by the following method.

Figure 5:
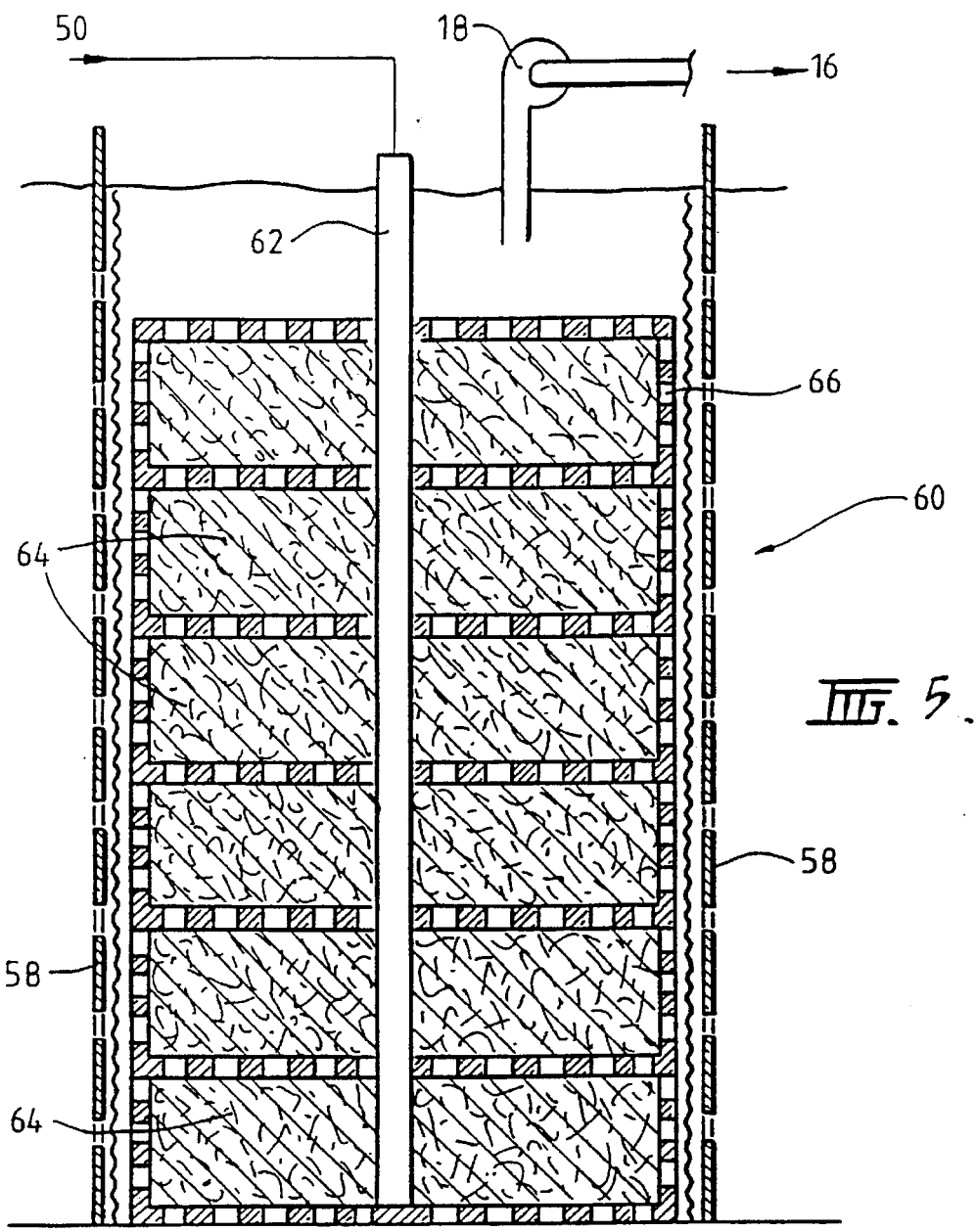
FIG. 5 is a schematic view of one form of the cathode arrangement employed in the process of the present invention.

With particular reference to FIG. 5, holes are drilled in the material in the dump at regularly spaced apart intervals on a 20 by 20 meter grid pattern and each hole is lined with a slotted pipe 58, inside of which is placed an electrode. One arrangement of one electrode, being a cathode is as illustrated in FIG. 5.

The electrodes in the holes are either anodes or cathodes. One form of the cathode arrangement 60 consists of a solid tube of metal 62 centrally axially located in the hole surrounded by activated carbon 64 which is held in baskets 66 to facilitate removal of the gold bearing carbon.

Figure 6:
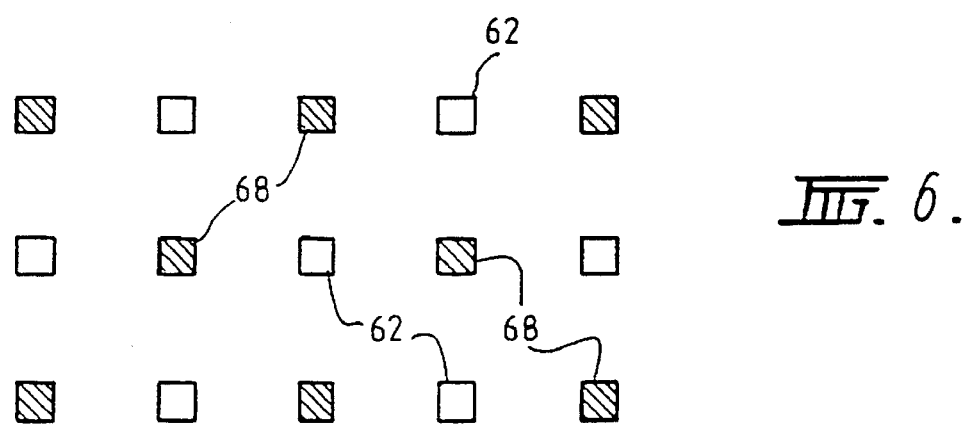
FIG. 6 is a schematic view of one arrangement of the electrodes used in the process of the present invention.
Figure 7A:
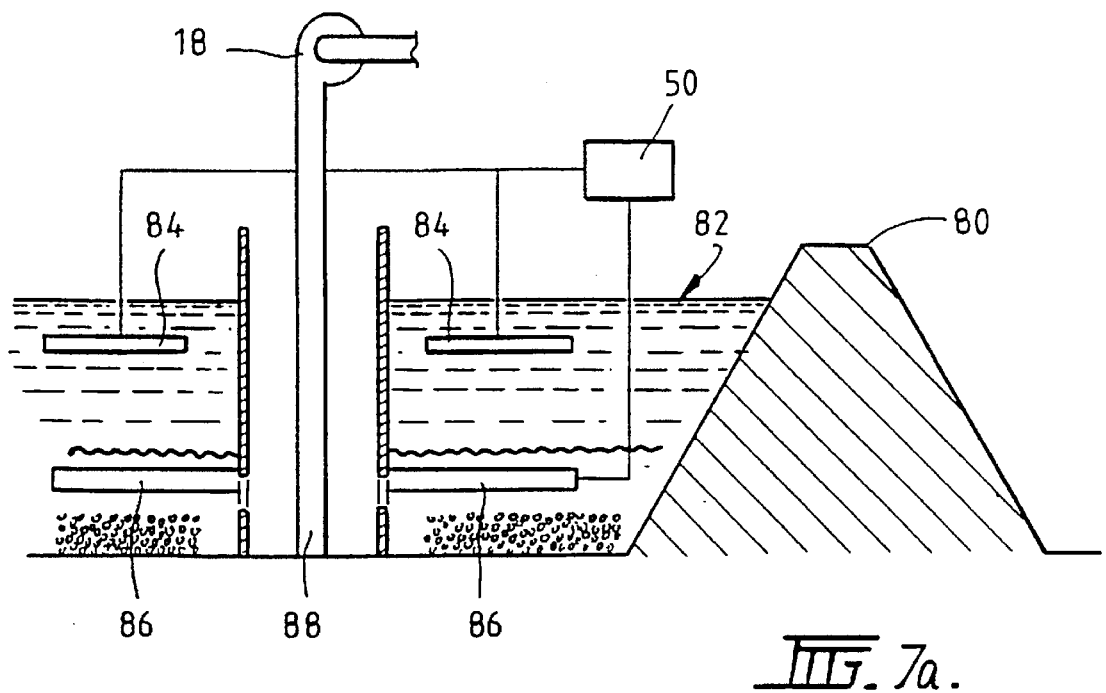
FIGS. 7(a), 7(b), 7(c) and 7(d) are schematic views of different arrangements of electrodes in leaching ponds for carrying out the method of the present invention.
Figure 7B:
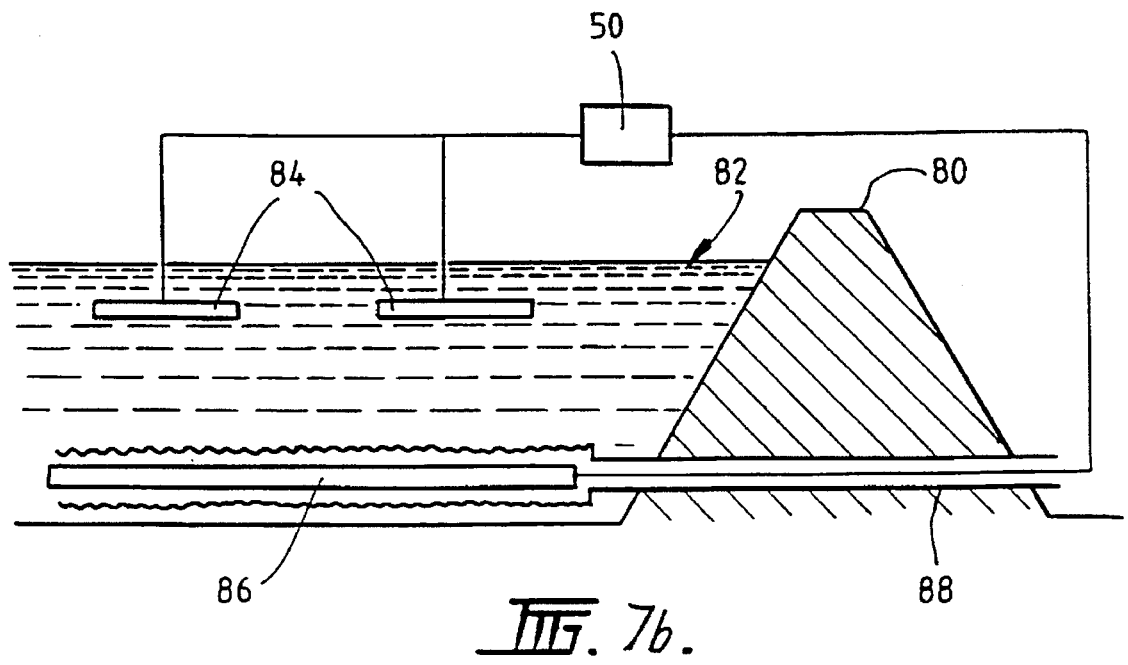
Figure 7C:
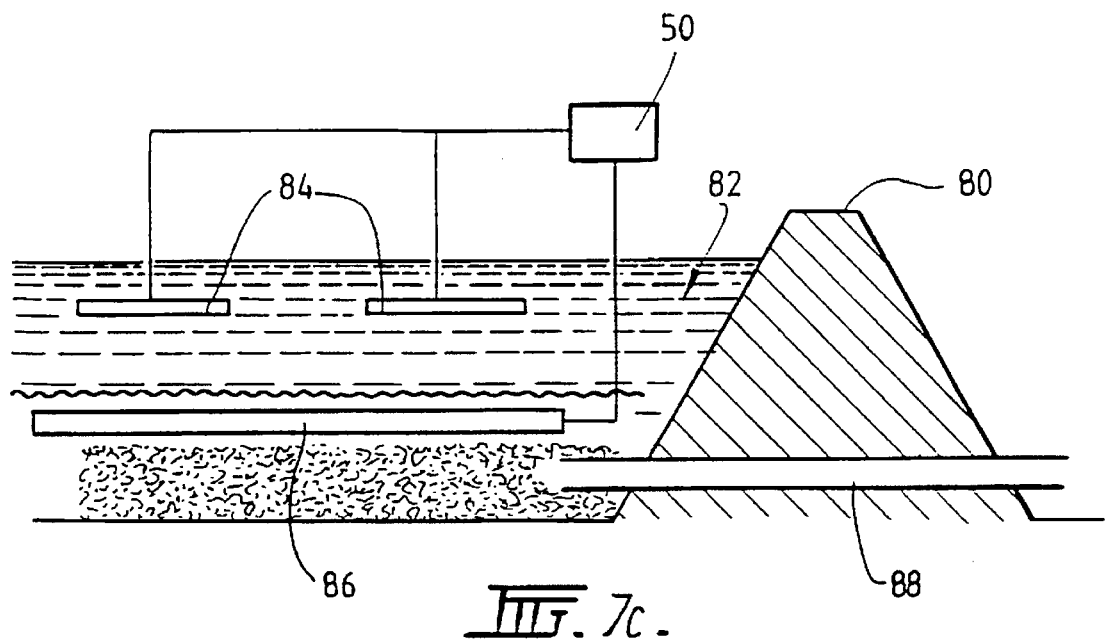
Figure 7D:
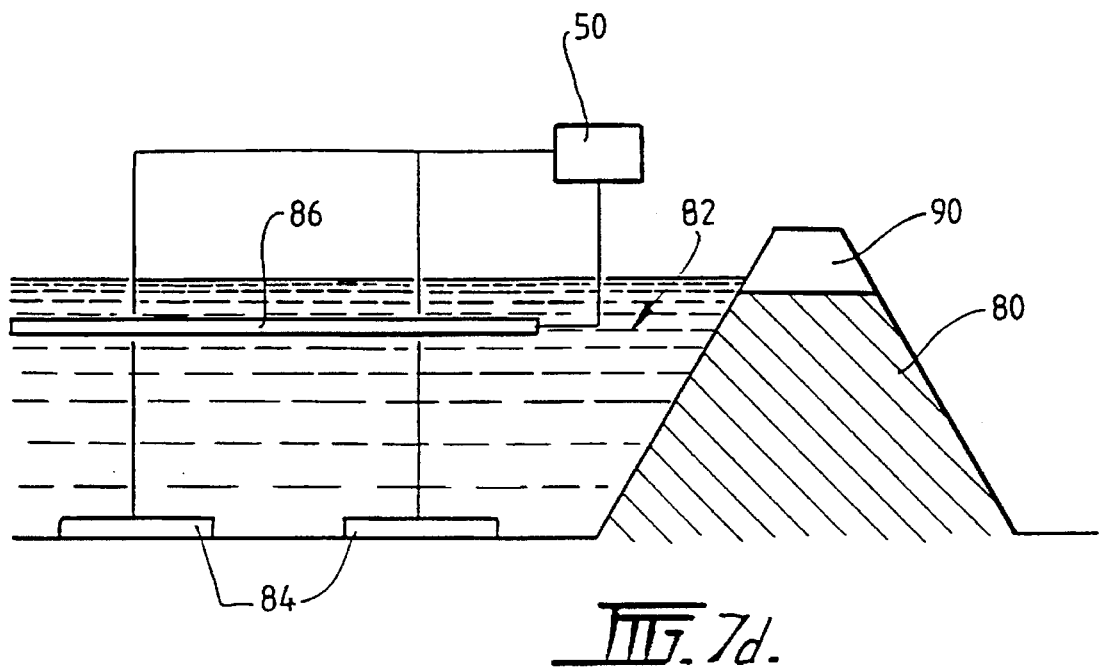

Anodes 68 are also located in holes cased in slotted pipe 58 similar to the cathodes. The arrangement of the positioning of the anodes, and cathodes with respect to each other is shown in FIG. 6.

The holes within which anodes 68 are positioned are kept full with barren solution which, under the effect of the electrical field produced by the potential difference applied to the electrodes, moves through the material in the dump of being treated towards the cathodes.

As the barren solution moves through the material in the dump towards the cathodes it picks up or otherwise leaches or dissolves gold from the material to form a gold containing leaching solution. As the gold containing solution reaches cathodes 62 the gold contained in the leaching solution is adsorbed by the activated carbon 64 held in baskets 66 surrounding the cathodes 62. Periodically, baskets 66 containing the carbon 64 are removed and the carbon treated using the process as described in example 1 to extract the gold.

The solution after passing through the activated carbon 64 is substantially free of gold and may then be pumped from cathodes 62 to a pond from which it will be returned to the anodes 68 to continue the processing of the material in the dump.

At any point in time a total of 36 cathodes, and the corresponding number of associated anodes are in use. The electrical potential is applied for a total of 120 days but after 100 days the recycling of solution to the anodes is stopped. During the last 20 days of the leach period the dump area surrounding the cathode is "dried out" enabling the activated carbon to be removed for further processing.

Table 6 shows the performance which has been achieved by one cathode while Table 7 shows the overall performance which has been achieved.

Although one embodiment of the present invention has been described in detail, other embodiments are possible depending on circumstances. Some of the other embodiments of the arrangement of the electrodes are shown in FIGS. and 9.

In FIGS. 7(a) to 7(d), there is shown different arrangements of the electrodes within the leach pond for use in carrying out the method of the present invention to facilitate gold dissolution.

In these embodiments, there is a dam wall or similar 80 containing liquid/solid mixture 82 in which is located anodes 84 and cathodes 86. The anodes and cathodes may be arranged as shown or may take any other arrangement.

Pregnant solution containing dissolved gold is drawn off via pipe 88 or overflow weir 90.

Figure 8A:
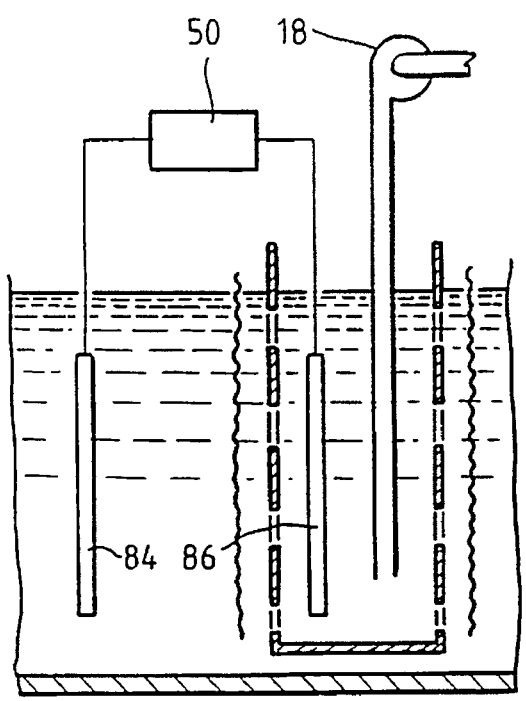
FIGS. 8(a), 8(b), 8(c) and 8(d) are schematic views of different configurations of individual electrodes or sets of electrodes used in the process of the present invention for treating materials.
Figure 8B:
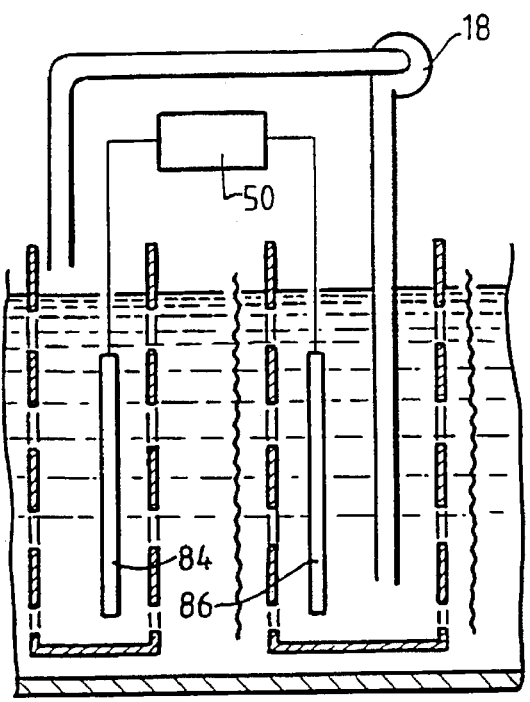
Figure 8C:
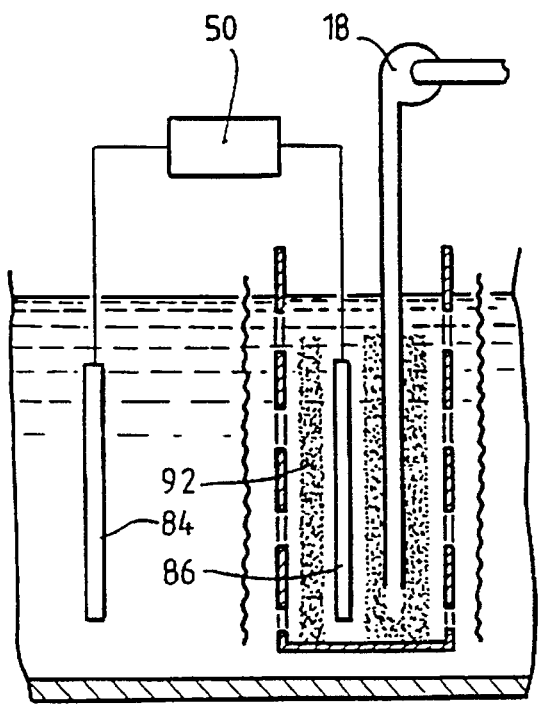
Figure 8D:
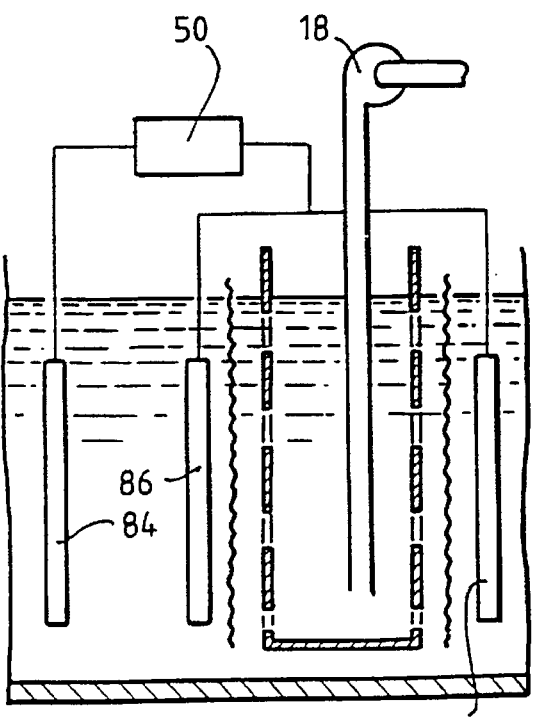

FIGS. 8(a) to 8(d) are shown four different configurations of electrodes comprising anode 84 and cathode 86 in the leach pond. In some embodiments, as shown in FIG. 8(c), cathode 86 is surrounded by absorbent material 92 for the dissolved gold in the leach solution.

The benefits and advantages of the present invention over existing methods relates to the low capital cost of setting up the plant for treatment of the ore materials and the operating costs involved in actually treating the ore material and the applicability of the present invention to materials having virtually any settling and size characteristics.

The lower capital and operating costs involved with the practice of the present invention means that resources which cannot be economically exploited using existing techniques can now ben treated and the overall process becomes economically viable.

The present invention could also be used as an adjunct to existing techniques to ensure that available resources are used to the maximum extent, and that gold is recovered more efficiently.

A further advantage of the present invention is that liquids used in the irrigation as leaching of the ore materials can be removed to a greater extent than is possible by existing methods. This greatly facilitates the rehabilitation of waste storage facilities.

TABLE 1

INDIVDUAL STAGES - EXAMPLE 1

| STAGE | SOLIDS tonnes | SOLN. M$^{-3}$ | % SOLIDS | GOLD UN DSLV OZS | GOLD DSLVD OZS | PREGNANT SOLUTION VOL M$^{-3}$ | PREGNANT SOLUTION GOLD OZS | PREGNANT SOLUTION GRADE ppm |
|---|---|---|---|---|---|---|---|---|
| FEED | 11200 | 26133 | 30.0% | 1800 | 0 | 0 | 0 | 0.00 |
| FILL | 11200 | 7467 | 60.0% | 942 | 620 | 18667 | 239 | 0.40 |
| LEACH | 11200 | 7467 | 60.0% | 202 | 468 | 11200 | 891 | 2.48 |
| DRAIN | 11200 | 2800 | 80.0% | 17 | 279 | 4667 | 374 | 2.49 |

TABLE 2

PERIOD OUTPUT FROM LEACH PONDS - EXAMPLE 1

| PERIOD | SOLN. M$^{-3}$ | GOLD DSLVD OZS | GRADE ppm |
|---|---|---|---|
| 1 | 18667 | 239 | 0.40 |
| 2 | 29867 | 1130 | 1.18 |
| 3-44 | 34533 | 1504 | 1.35 |
| 45 | 27867 | 1419 | 1.58 |
| 46 | 11867 | 947 | 2.48 |
| 47 | 3000 | 240 | 2.49 |

TABLE 3

ANNUAL AND OVERALL PERFORMANCE - EXAMPLE 1

| YEAR | TONNES | FEED GRADE g/t | GOLD OZS | GOLD RECOVERED OZS | PROGRESSIVE RECOVERY % |
|---|---|---|---|---|---|
| 1 | 145600 | 5.0 | 23405 | 17911 | 76.5% |
| 2 | 145600 | 5.0 | 23405 | 19550 | 80.0% |
| 3 | 145600 | 5.0 | 23405 | 19550 | 81.2% |
| 4 | 63200 | 5.0 | 10159 | 10125 | 83.5% |
| TOTAL | 500000 | 5.0 | 80376 | 67136 | 83.5% |

TABLE 4

PERFORMANCE ON ONE MONTHS ORE - EXAMPLE 2

| DAY | PREGNANT SOLUTION VOL M$^{-3}$ | PREGNANT SOLUTION GRADE ppm | PREGNANT SOLUTION GOLD OZS | REMAINING U/D GOLD OZS | REMAINING DISVL. GOLD OZS | EXTRACTION % DISLV | EXTRACTION % REC. |
|---|---|---|---|---|---|---|---|
| 10 | 107 | 1.79 | 6 | 809 | 107 | 24.5% | 0.6% |
| 20 | 2729 | 1.80 | 158 | 686 | 117 | 36.0% | 14.7% |
| 30 | 5739 | 1.67 | 308 | 573 | 101 | 46.5% | 28.8% |
| 40 | 8748 | 1.54 | 434 | 479 | 89 | 55.3% | 40.5% |
| 50 | 11757 | 1.42 | 538 | 401 | 79 | 62.6% | 50.2% |
| 60 | 14766 | 1.32 | 625 | 335 | 70 | 68.7% | 58.4% |
| 70 | 17776 | 1.22 | 699 | 280 | 63 | 73.9% | 65.2% |
| 80 | 20785 | 1.14 | 760 | 234 | 57 | 78.1% | 70.9% |
| 90 | 23794 | 1.06 | 811 | 222 | 52 | 79.3% | 75.6% |
| 100 | 24767 | 1.06 | 841 | 209 | 34 | 80.5% | 78.5% |

TABLE 4-continued

PERFORMANCE ON ONE MONTHS ORE - EXAMPLE 2

| DAY | PREGNANT SOLUTION | | | REMAINING U/D GOLD ozs | DISVL. GOLD ozs | EXTRACTION | |
|---|---|---|---|---|---|---|---|
| | VOL $M^{-3}$ | GRADE ppm | GOLD ozs | | | % DISLV | % REC. |
| 110 | 25515 | 1.04 | 855 | 196 | 33 | 81.7% | 79.8% |
| 120 | 26088 | 1.03 | 860 | 186 | 39 | 82.7% | 80.3% |
| RELEACH | 10000 | 1.34 | 431 | 54 | 27 | 12.3% | 13.5% |
| TOTAL | 36088 | 1.11 | 1291 | 54 | 27 | 95.0% | 93.7% |

TABLE 5

OVERALL PERFORMANCE - EXAMPLE 2

| YEAR | FEED | | | PREGNANT SOLUTION | | GOLD PROD. ozs |
|---|---|---|---|---|---|---|
| | CRUSH TONNES | GRADE g/t | GOLD ozs | VOL $M^{-3}$ | GRADE ppm | |
| 1 | 200000 | 2.0 | 12860 | 131347 | 1.09 | 4592 |
| 2 | 200000 | 2.0 | 12860 | 179835 | 1.60 | 9223 |
| 3 | 200000 | 2.0 | 12860 | 202743 | 1.87 | 12212 |
| 4 | 200000 | 2.0 | 12860 | 202743 | 1.87 | 12212 |
| 5 | 200000 | 2.0 | 12860 | 202743 | 1.87 | 12212 |
| 6 | | | | 71396 | 3.32 | 7619 |
| 7 | | | | 13745 | 4.96 | 2192 |
| TOTAL | 1000000 | 2.0 | 64300 | 1004552 | 1.87 | 60261 |

TABLE 6

PERFORMANCE AT CATHODE DURING LEACH - EXAMPLE 3

| | PREGNANT SOLUTION | | | | | ORE REMAINING | | |
|---|---|---|---|---|---|---|---|---|
| | DAILY | | PROGRESSIVE | | | | | |
| DAY | VOL $M^{-3}$/day | GRADE ppm | VOL $M^{-3}$ | GRADE ppm | GOLD ozs | TONNES | GRADE g/t | GOLD ozs |
| | | | | | | 6000 | 1.00 | 192.9 |
| 20 | 52.9 | 1.70 | 1059 | 1.70 | 57.9 | 6000 | 0.70 | 135.0 |
| 40 | 52.9 | 0.85 | 2118 | 1.27 | 86.8 | 6000 | 0.55 | 106.1 |
| 60 | 52.9 | 0.43 | 3176 | 0.99 | 101.3 | 6000 | 0.48 | 91.6 |
| 80 | 52.9 | 0.21 | 4235 | 0.80 | 108.5 | 6000 | 0.44 | 84.4 |
| 100 | 52.9 | 0.11 | 5294 | 0.66 | 112.1 | 6000 | 0.42 | 80.8 |
| 120 | 26.5 | 0.11 | 5824 | 0.61 | 113.9 | 6000 | 0.41 | 79.0 |

TABLE 7

OVERALL PERFORMANCE - EXAMPLE 3

| QUARTER | PREGNANT SOLUTION | | | RECOVERY OF REMAINING IN DUMP | | | |
|---|---|---|---|---|---|---|---|
| | VOL $M^{-3}$ | GRADE ppm | GOLD ozs | GOLD | SOLUBLE GOLD | GRADE g/t | GOLD ozs |
| 1 | 135794 | 0.85 | 3730 | 11.6% | 19.3% | 0.88 | 17052 |
| 2 | 154853 | 0.68 | 3399 | 10.6% | 17.6% | 0.78 | 15013 |
| 3 | 156838 | 0.49 | 2478 | 7.7% | 12.8% | 0.70 | 13526 |
| 4 | 163985 | 0.53 | 2801 | 8.7% | 14.5% | 0.61 | 11845 |
| YEAR 1 | 611471 | 0.63 | 12408 | 38.6% | 64.3% | 0.61 | 11845 |

TABLE 7-continued

| | OVERALL PERFORMANCE - EXAMPLE 3 | | | | | | |
|---|---|---|---|---|---|---|---|
| | PREGNANT SOLUTION | | | | RECOVERY OF REMAINING IN DUMP | | |
| QUARTER | VOL $M^{-3}$ | GRADE ppm | GOLD ozs | GOLD | SOLUBLE GOLD | GRADE g/t | GOLD ozs |
| 1 | 162794 | 0.71 | 3703 | 11.5% | 19.2% | 0.50 | 9624 |
| 2 | 96606 | 0.58 | 1811 | 5.6% | 9.4% | 0.44 | 8537 |
| YEAR 2 | 259400 | 0.66 | 5514 | 17.2% | 28.6% | 0.44 | 8537 |
| TOTAL | 870871 | 0.64 | 17922 | 55.7% | 92.9% | 0.44 | 8537 |

The described arrangement has been advanced by explanation and many modifications may be made without departing from the spirit and scope of the invention which includes every novel feature and novel combination of features hereindisclosed.

Those skilled in the art will appreciate that the invention described herein is susceptible to variations and modifications other than those specifically described. It is understood that the invention includes all such variations and modifications which fall within the spirit and scope.

We claim:

1. A method of treating a solid material containing a substance of economic importance to recover or extract the substance from the material, said method comprising forming a conducting mixture of the solid with a liquid so that at least some of the substance of economic importance is dissolved in the liquid, said liquid being at least partially conducting, applying an electrical potential difference between at least two electrodes in contact with the mixture at spaced apart locations so as to impart opposite charges to the respective electrodes thereby attracting the liquid containing the dissolved substance to one of the electrodes, removing the attracted liquid from an area surrounding or from a vicinity of the one electrode, and treating the removed liquid containing the substance of economic importance so as to recover or extract the substance.

2. The method of claim 1 in which the liquid is an aqueous solution in the form of a leaching or irrigating solution.

3. The method of claim 2 in which the leaching or irrigating solution dissolves at least partially the substance of economic importance.

4. The method of claim 3 in which the leaching or irrigating solution contains cyanide.

5. The method of claim 1 in which the solid material being treated is either virgin material or is material that has been previously treated to recover the substance of economic importance.

6. The method of claim 1 in which the potential difference applied across the electrodes is in the range of less than one volt to several hundred volts.

7. The method of claim 1 in which the step of applying the potential difference across the electrodes result in a power being consumed in the range of 0.1 to 100 kilowatt-hours per tonne of solid material being treated.

8. The method of claim 1 in which the step of applying the potential difference across the electrodes causes a current to pass through the conducting mixture wherein the current is about 1 ampere per square meter.

9. The method of claim 1 in which the leaching of the solid material being treated takes from 10 days to one year or more.

10. The method of claim 1 in which the solid/liquid mixture comprises 40% to 70% liquid by weight.

11. The method of claim 1 further comprising recycling the liquid through the solid material being treated.

12. The method of claim 1 in which the electrodes comprise one or more anodes interconnected together and one or more cathodes interconnected together.

13. The method of claim 1 in which one of the electrodes is more or less surrounded by absorbent material for absorbing the material of economic importance.

14. The method of claim 1 in which the substance of economic importance is selected from the group consisting of gold, silver and copper.

15. The method of claim 1 further comprising pretreating the solid material to facilitate dissolution of the substance of economic importance.

16. The method of claim 1 in which the electrodes are arranged so as to take advantage of the use of electrophoresis to assist with settling of fine particles.

17. The method of claim 1 further comprising reversing polarity of the electrodes either as a single occurrence or periodically.

* * * * *